S. VREELAND.
Carriage Wheel.
No. 92,915.  Patented July 20, 1869.
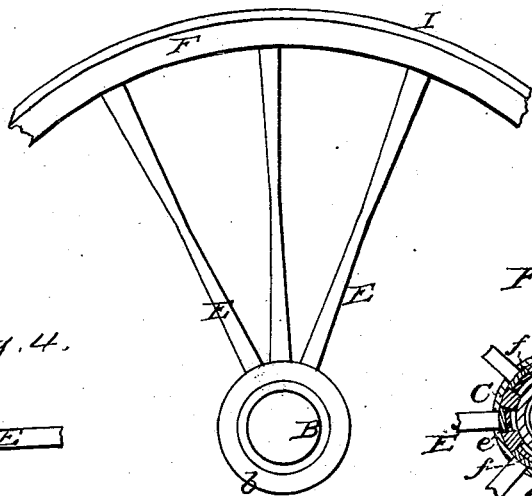
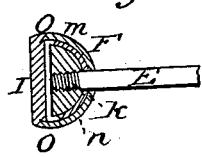
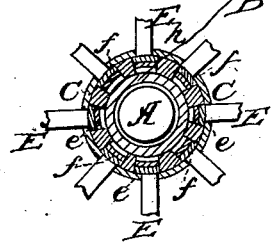
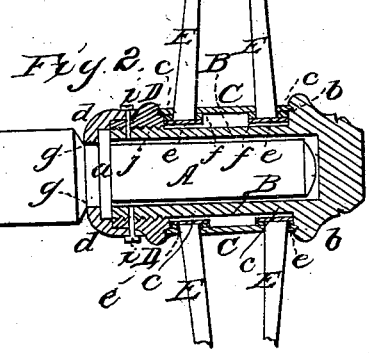
Witnesses:
Geo C Green
Chas H. Poole
Inventor:
Simon Vreeland
By J. B. Woodruff & Son
Attorneys.

United States Patent Office.

SIMON VREELAND, OF CUBA, NEW YORK.

Letters Patent No. 92,915, dated July 20, 1869.

---

IMPROVEMENT IN CARRIAGE-WHEELS.

---

The Schedule referred to in these Letters Patent and making part of the same.

---

*To all whom it may concern:*

Be it known that I, SIMON VREELAND, of Cuba, in the county of Allegany, and State of New York, have invented certain new and useful Improvements in Metallic Suspension-Wheels for Vehicles, and the mode of constructing the same; and the following is a full, clear, and exact description of the same, reference being had to the accompanying drawings, making a part of this specification, in which—

Figure 1 represents a section of a metallic wheel for carriages or other vehicles, showing the form of the spokes, and a broken section of the hollow metal rim.

Figure 2 shows a section through the hub or journal-box of the wheel, with the construction of the same; the mode of inserting and securing the spokes in the shell or outer central portion; the pipe-box and fastening-nut, and the manner of holding the wheel on to its axle.

Figure 3 is an end-view section through the same.

Figure 4 shows a sectional end view of the semicircular felloe, with the mode of securing the spokes, and also the setting of the tire, and holding the same.

To enable others to make and use my invention, I will describe it more fully, referring to the drawings, and the letters of reference marked thereon.

The object of my improvements is to make light, strong, and durable wheels for vehicles, those that will yield sufficiently to prevent breaking, and be relieved from sudden jars; and It consists in the construction of the hub, with its component parts, with bevelled joints to hold the strain of the portion in which the spokes are inserted; the form of the spokes, they being tapering towards their centre.

Also, in the manner of attaching and securing the wheels to the axles, by a cap made in two halves to fit on to the inner end of the octagonal screw-cap on the pipe-box, embracing the collar near the shoulder of the axle, secured by set-screws, so as to be easily removed and replaced for lubricating, &c.

My improved metal wheel is made in the following manner:

To the axle A, which has a ring-collar, *a*, surrounding it near to its shoulder, is fitted the pipe-box B, made of cast-iron, the outer end being closed so that the axle does not come clear through.

A projecting flange, *b b*, is cast on the outer end of the pipe B, of sufficient diameter to admit of a V-shaped groove or recess, *c c*, being made in it, into which is fitted the wrought-iron cylinder C C, the ends being bevelled to fit the V-shaped groove *c c*.

On the inner end of the pipe B is a screw-thread, *j j*, on to which is fitted a flange-cap, D, with a V-shaped groove, *c' c'*, to match the one in the opposite end, so that when the flange-cap *d d* is screwed on to the pipe B, and the cylinder C is in its place between the flanges, the bevelled edges in the grooves, the cylinder is held in the most firm and substantial manner, a portion of the cap-flange D being made octagonal, for the purpose of putting on a wrench to screw the parts firmly together.

On to the octagonal portion of the flanged cap *d d*, is fitted another cap, *d d*, made in two halves, with a recess to admit and fit the ring-collar *a* on the axle A, the end forming a feather, *g g*, to hold the wheel on the axle, the caps *d d* being held to the screw-cap D by set-screws *i i*, so that they may be easily taken off for lubricating the axle; and when on, and secured in their place, will effectually prevent any dirt or grit from getting into the journals or bearings of the axles.

The spokes E E are made of wrought-iron or steel rods, they being reduced in size between their ends, so as to taper towards the centre, making the weakest place away from both ends, so that they can yield a little when required.

The ends of the spokes, which are secured in the cylinder C, have their square heads, *e e*, and are provided with elastic India-rubber washers, *f f*, between them and the cylinder C, they being put into the cylinder from the inside, before the tube or pipe-box B is put in, and are secured from turning in their place by driving strips of hard wood, *h h*, between the heads *e e*, in the space between the box B and cylinder C.

The other ends of the spokes E E are provided with a screw, K, and a nut, *m*, to hold them in the felloe F, between which and the nut *m* is placed elastic rubber, *n*, so that when the felloe or rim F is on, and the spokes E screwed up, the rim may be made true, or it may, by screwing and unscrewing the spokes, be adjusted so as to run true in a direct line at any time, should the wheel be warped or made winding, by the setting of the tire I.

It will readily be seen, and it has been practically demonstrated, that wheels constructed in the manner as above described, can be made very light and symmetrical, and yet possess great strength and durability, and they run with a lightness and elasticity not felt by any other wheels that have come to my knowledge.

What I claim as my invention, and desire to secure by Letters Patent, is—

1. The metal hub, as constructed with a wrought-iron cylinder, C, whose ends are bevelled off to fit into V-shaped grooves, *c c*, in the flanges *b* and D', in combination with the pipe-box B, screw-cap D, holding-caps *d d*, secured by set-screws *i i*, and collar *a*, on the axle A, substantially as and for the purposes specified.

2. In combination with the metal hub, as above described, the metal spokes E E, as constructed, they being the largest at the ends, tapering towards the centre, and are provided with square heads, *e e*, elastic washers, *f f*, they being inserted and secured in the cylinder C, as herein described.

In testimony whereof, I hereunto subscribe my name, in the presence of—

SIMON VREELAND.

Witnesses:
J. B. WOODRUFF,
ROSWELL WAKEMAN.